(No Model.)
M. RYAN.
HEAT CONDUCTOR AND RADIATOR.
No. 305,713. Patented Sept. 23, 1884.
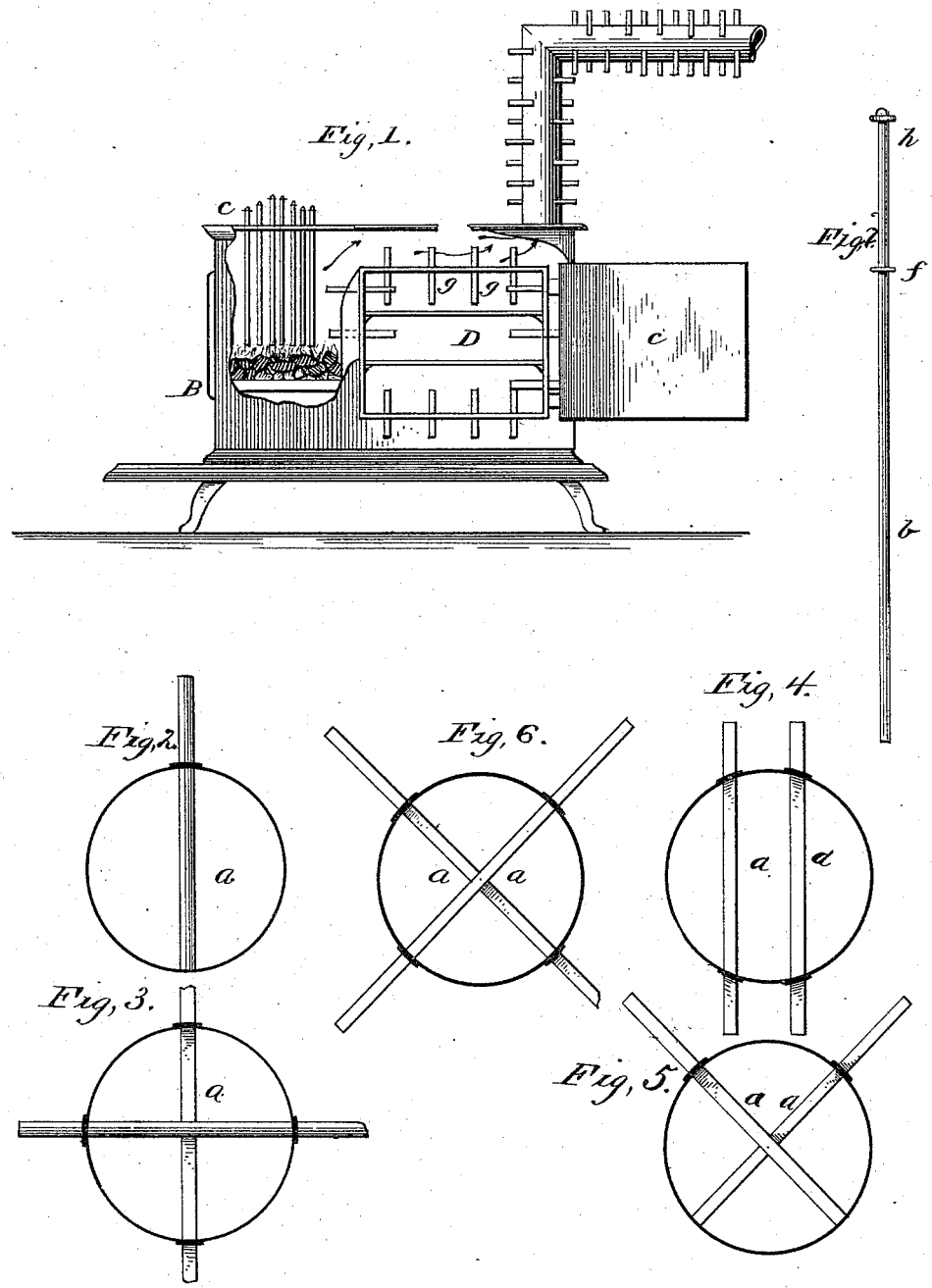
Witnesses:
Inventor:
Matthew Ryan
per O. E. Duff
Atty.

United States Patent Office.

MATTHEW RYAN, OF WASHINGTON, DISTRICT OF COLUMBIA.

HEAT CONDUCTOR AND RADIATOR.

SPECIFICATION forming part of Letters Patent No. 305,713, dated September 23, 1884.

Application filed December 13, 1883. (No model.)

*To all whom it may concern:*

Be it known that I, MATTHEW RYAN, of Washington, in the District of Columbia, have invented certain new and useful Improvements in Heat Conductors and Radiators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to improved means for utilizing the heat emanating from fuel in combustion and the waste gases proceeding therefrom.

It consists in the combination, with the discharge-flue of a stove or furnace, of a series of metallic rods or bars extending completely through the portion of said flue of the greatest degree of temperature and outwardly into the space to be heated, whereby the absorbing-surface of the said bars or rods is interposed directly in the path of the most highly heated of the outgoing products of combustion.

My invention further consists in certain details of construction and dispositions of parts, more particularly pointed out in the claims hereunto annexed.

Referring to the drawings forming part of this specification, and to the letters of reference marked thereon, Figure 1 represents in elevation its application to a cooking and baking stove; Figs. 2, 3, 4, 5, and 6, in plan and cross-section, and Fig. 7, in elevation, details of my invention.

It is a well-recognized fact that in stoves of the ordinary construction a large portion of the heat generated by the burning fuel, being taken up by the products of combustion and associated air, is carried off through the discharge-flues to the chimney and dissipated in the external atmosphere. The useful effect obtainable from a given amount of fuel at its desired point of application is therefore greatly lessened, and in calculating the calorific results allowance must always be made for this lost or waste heat. The communication, moreover, of the waste heat to the chimney and branch flues is a source of great inconvenience when such flues lead through or in the walls of apartments which it is desirable to keep cool. Especially is this true in the height of summer in dwelling-houses, the fires for domestic purposes being generally situated upon the ground-floor and the chimney-flue passing upward in the partition-wall past the domicile and sleeping apartments. To obviate both of these defects I propose to localize the effect of the heat produced from the fuel by causing the absorption and radiation of the hitherto wasted heat within the immediate limits of effective action. The means employed by me to accomplish these results, and illustrated and described in my present application, have, moreover, additional functions of great practical value. Thus, by reason of my improved construction, I am enabled to secure more nearly equal distribution of heat from the radiating surfaces, and to avoid sudden variation in temperature arising from the irregular operation of fire.

In Fig. 1, A represents an ordinary cylindrical stove, a part thereof being shown as broken away in order to disclose the interior disposition of parts. The stove is provided with the closing-lid c. This lid is of the construction shown in Fig. 4, and is furnished with perforations d of appropriate number, size, and arrangement, and designed for the reception of a series of rods. The latter should be made of material having high heat-conducting powers, and will, in most cases, be of metal, although other substances having similar properties—such as porcelain—may be usefully employed. For purposes of economy, however, I contemplate constructing the rods of cast-iron, and preferably of the cylindrical form shown in Fig. 10. The downward movement of the rods is limited by means of the fixed collar *f*, the top terminating in an ornamental button, *h*. The rods are intended to fit the perforations with a degree of friction sufficient to sustain them at any desired height. In view of this fact it is evident that the lid and rods, respectively, should be made of material having substantially the same expansibility when exposed to heat. Thus, if the rod expanded more with the same heat than the lid, the latter would be liable to break. On the other hand, if the lid has greater expansibility the diameter of the perforations would increase in greater proportion than that of the rods, and would no longer retain them in position. The rods being inserted in the perforated cover, as shown, the latter is placed upon the stove. The lower ends of the rods approach the zone of combustion and receive and communicate to the outer ends, and thence to the apartment in which the stove is situated the heat absorbed from the fire.

A series of careful experiments made with a view of testing this device demonstrates the fact that the presence of the rods greatly lessens the heat communicated by the outgoing products of combustion to the conducting stove-pipes, the heat of the waste gases passing in great part by conduction into the apartment and in the immediate vicinity of the stove. It may be also noted that the rods in this position prevent in large measure the passage of soot into the pipes and flues, and the corrosive effect of gases destructive to stove-pipes is also primarily exerted upon them. The rods also exercise the additional useful function, in connection with an additional feature of my invention, of delaying or retarding the outgoing gases, so that in passing more slowly through the sheet-iron stove-pipe they may give up a further portion of their heat to devices arranged in the latter.

I have not illustrated in Fig. 1 the stove-pipe connection, but I wish it to be understood that I contemplate using, in connection with the upright stove therein shown, a pipe having the peculiarities of construction illustrated at E, Fig. 2, and in the detail views explanatory of the same.

In Fig. 2 is shown a cooking-stove, B, provided with a rod-carrying lid, c, constructed and arranged with respect to the fire in a similar manner to that hereinbefore described. The stove is provided with the elbow-pipe E, perforated at diametrically-opposite points, as shown in Figs. 6 and 9, at opposite points not diametrically, as in Fig. 7, at a single point, as in Fig. 5, or as in Fig. 8. In these perforations I insert rods a, of a similar material to that used for the rods b. I provide these rods with suitable washers to prevent escape of the products of combustion into the apartment. The rods, as arranged in the stove-pipe, supplement the action of the vertical rods b, and take up from the less rapid current an additional amount of heat. The number and arrangement of rods in the stove-pipe will lie largely in the discretion of the constructor. They should not materially interfere with a proper draft for the fire. I have found on actual experiment that under ordinary conditions they can be arranged at distances of approximately six inches apart along the length of the pipe, and a good working-draft maintained in the stove. Any inconvenience arising from interference with the draft is more than compensated for by the amount of heat saved.

In various experiments with the lid arrangement shown I have effected a considerable saving of heat, and in one test with the stove-pipe arrangement about 370°.

Another application of my broad invention consists in applying the rods, as shown in Fig. 2, to a baking or roasting oven, D, within the stove. The rods as thus arranged and extending into the oven-space act not only as heat-conductors, but also as heat regulators and distributers. A sudden lowering or partial extinguishment of the fire does not affect the oven and its contents until the heat stored up in the rods has been given up. The rods act therefore as reservoirs of heat. In portions of the oven remote from the fire a greater number of them may be inserted, thus insuring uniformity of heat throughout its extent. The oven is provided with a door, C, and the rods q may be either inserted in perforations made in the oven-walls, or may be cast integrally therewith, which latter method, on account of its cheapness, I prefer.

In Fig. 3 I have illustrated in plan the covering-plate e of a self-feeding or magazine stove provided with perforations d for the reception of vertical rods.

It is to be understood that the vertical rods in all cases are not to come in contact with the burning fuel or enter the flame-region so as to interfere with the orderly course of combustion and generate noxious gases.

I am aware that it has been heretofore proposed to utilize waste heat by means of rods or plates projecting from the exterior walls of escape-flues and partially penetrating the interior of the latter. In all of these arrangements, however, the region of greatest heat (which in vertical pipes is directly in the center, and in horizontal pipes is in their upper portions) has not been reached by the conducting material. The consequence is that but a very small and unimportant quantity of the waste heat has been saved—to wit, that present in the colder portions of the escaping products, immediately adjoining the vertical walls. In my invention, on the contrary, the conductors pass directly through the hottest path of the outgoing gases, taking up and transmitting almost the entire quantity of the waste heat.

Having thus described my invention, what I claim is—

The combination, with the discharge-flue of a stove or furnace, of a series of metallic rods or bars extending completely through the hottest portion of said flue, and outwardly into the space to be heated, whereby the absorbing-surface of the said bars or rods is interposed directly in the path of the most highly heated of the outgoing products of combustion, substantially as shown and described.

In testimony that I claim the foregoing as my own I affix my signature in presence of two witnesses.

MATTHEW RYAN.

Witnesses:
JOHN C. PENNIE,
EDWARD E. ELLIS.